United States Patent
Doerr et al.

(10) Patent No.: US 7,257,285 B2
(45) Date of Patent: Aug. 14, 2007

(54) WAVELENGTH-SELECTIVE SWITCH AND INTEGRATED WAVELENGTH DEMULTIPLEXER USING STACKED PLANAR LIGHTWAVE CIRCUITS

(75) Inventors: Christopher Richard Doerr, Middletown, NJ (US); Dan Mark Marom, Howell, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 141 days.

(21) Appl. No.: 11/073,010

(22) Filed: Mar. 4, 2005

(65) Prior Publication Data

US 2006/0198575 A1 Sep. 7, 2006

(51) Int. Cl.
G02B 6/35 (2006.01)
G02B 6/28 (2006.01)

(52) U.S. Cl. .............................. 385/18; 385/24; 385/33; 385/37; 385/46; 385/129; 385/14

(58) Field of Classification Search ................... 385/16, 385/18, 24, 27, 33, 37, 46, 129, 14
See application file for complete search history.

(56) References Cited

U.S. PATENT DOCUMENTS 6,778,739 B1 * 8/2004 Jerphagnon et al. .......... 385/52

2003/0206684 A1 11/2003 Nishi et al.

FOREIGN PATENT DOCUMENTS

WO WO 03/098856 A 11/2003
WO WO 03/098962 11/2003

* cited by examiner

Primary Examiner—Frank G. Font
Assistant Examiner—Michael P. Mooney

(57) ABSTRACT

Wavelength-selective switches (WSSs) having embedded multiplexer or demultiplexer functionality include a stack of planar waveguide circuits (PLCs) in which all but one of the PLCs have identical features consisting of a single waveguide connected to a free space region, further connected to a waveguide array that terminates at the PLC edge facet, which are placed at the front focal plane of a lens, generating a spectrally resolved optical signal at the back focal plane of the lens. Due to the use of a single lens, the spectrally resolved optical signal of all the PLCs are superimposed, differing only by propagation direction. A tilting micro-mirror array at the back focal plane reflects the spectral components, implementing a wavelength-selective switch. The reflected light can couple to any of the remaining PLCs, for multiplexing, or to the different PLC in the stack, which implements the multiplexer/demultiplexer.

20 Claims, 5 Drawing Sheets

WAVELENGTH-SELECTIVE SWITCH AND INTEGRATED WAVELENGTH DEMULTIPLEXER USING STACKED PLANAR LIGHTWAVE CIRCUITS

FIELD OF THE INVENTION

The present invention relates to wavelength-division multiplexed optical networking components, and more particularly to wavelength-selective switches for routing channels and demultiplexers for channel add/drop functionality within a stacked array of planar lightwave circuits.

BACKGROUND OF THE INVENTION

Optical networks are evolving towards a mesh architecture. In optical mesh networks, the network topology consists of nodes and interconnecting links. The traffic on the fiber-optic links utilizes wavelength-division multiplexing (WDM) for increasing the capacity on the link. At the network nodes, the channels on ingress fibers are either routed to egress fibers for transmission to subsequent network nodes, or the channels terminate at the node for local utilization of the information carried therein. The hardware to implement this functionality at the node can be based on electronic switching fabrics, requiring optical-to-electronic-to-optical conversions, or they can be implemented entirely in the optical regime. The latter approach is advantageous due to savings in cost, power consumption, and space requirements.

FIG. 1 depicts a conventional network node architecture 100 An ingress fiber 102 (out of multiple ingress fibers, rest not shown) connects to an input port 106 of a demultiplexing-type wavelength-selective switch (WSS) 110. Other multiple ingress fibers of the node (not shown in FIG. 1) are each connected to an input port of other demultiplexing-type WSS's (also not shown). WSS 110 has a single input port 106 and multiple output ports 114-A through 114-D. WSS 110 can route the WDM channels in an independent and reconfigurable fashion from input port 106 to any one of output ports 114-A through 114-D. In the network node architecture illustrated in FIG. 1, channels that are destined from ingress fiber 102 to continue to an egress fiber 126 are routed by WSS 110 to output port 114-C. Output port 114-C is connected to an input port 116-C of a multiplexing-type WSS 120. WSS 120 has multiple input ports 116-A through 116-D and a single output port 122. WSS 120 can route any WDM channel in an independent and reconfigurable fashion from any one of input ports 116-A through 116-D to output port 122. Therefore, channels that are destined from ingress fiber 102 to continue to egress fiber 126 are routed by WSS 110 to output port 114-C and further routed by WSS 120 to output port 122, which is connected to egress fiber 126. The network node shown in FIG. 1 would typically have additional egress fibers, which are not shown here. Other multiple egress fibers of the node (not shown in FIG. 1) are each typically connected to the output of other multiplexing-type WSS's (also not shown). Output ports 114-A and 114-B of WSS 110 are each connected to one input port of such other WSS for routing channels from ingress fiber 102 to other egress fibers. Channels that are destined from ingress fiber 102 to be utilized locally at the node are routed by WSS 110 to output port 114-D, which is connected to the input of a demultiplexer 130. Demultiplexer 130 passively separates the WDM channels to output ports 134-A through 134-N, where the separated channels can be detected by opto-electronic means. In an analogous manner, channels that are added at this network node for transmission to egress fiber 126 are connected to ports 136-A through 136-N of multiplexer 140, and an output 142 of multiplexer 140 is connected to input port 115-D of multiplexing-type WSS 120. WSS 120 routes the added channels from input port 116-D to output 122, which is connected to egress fiber 126.

What is needed are methods and apparatus for reducing the number of individual components, and reducing the losses conventionally incurred in routing optical signals from an ingress fiber to drop ports, and in routing optical signals from add ports to an egress fiber.

SUMMARY OF THE INVENTION

Briefly, the present invention includes a wavelength-selective switch with an embedded multiplexer/demultiplexer based on a stacked array of planar lightwave circuits (PLCs) and free-space switching between the PLCs. Various embodiments of the present invention can switch optical WDM channels among multiplexed input/output ports and to the demultiplexed ports.

DETAILED DESCRIPTION

Figure 1:
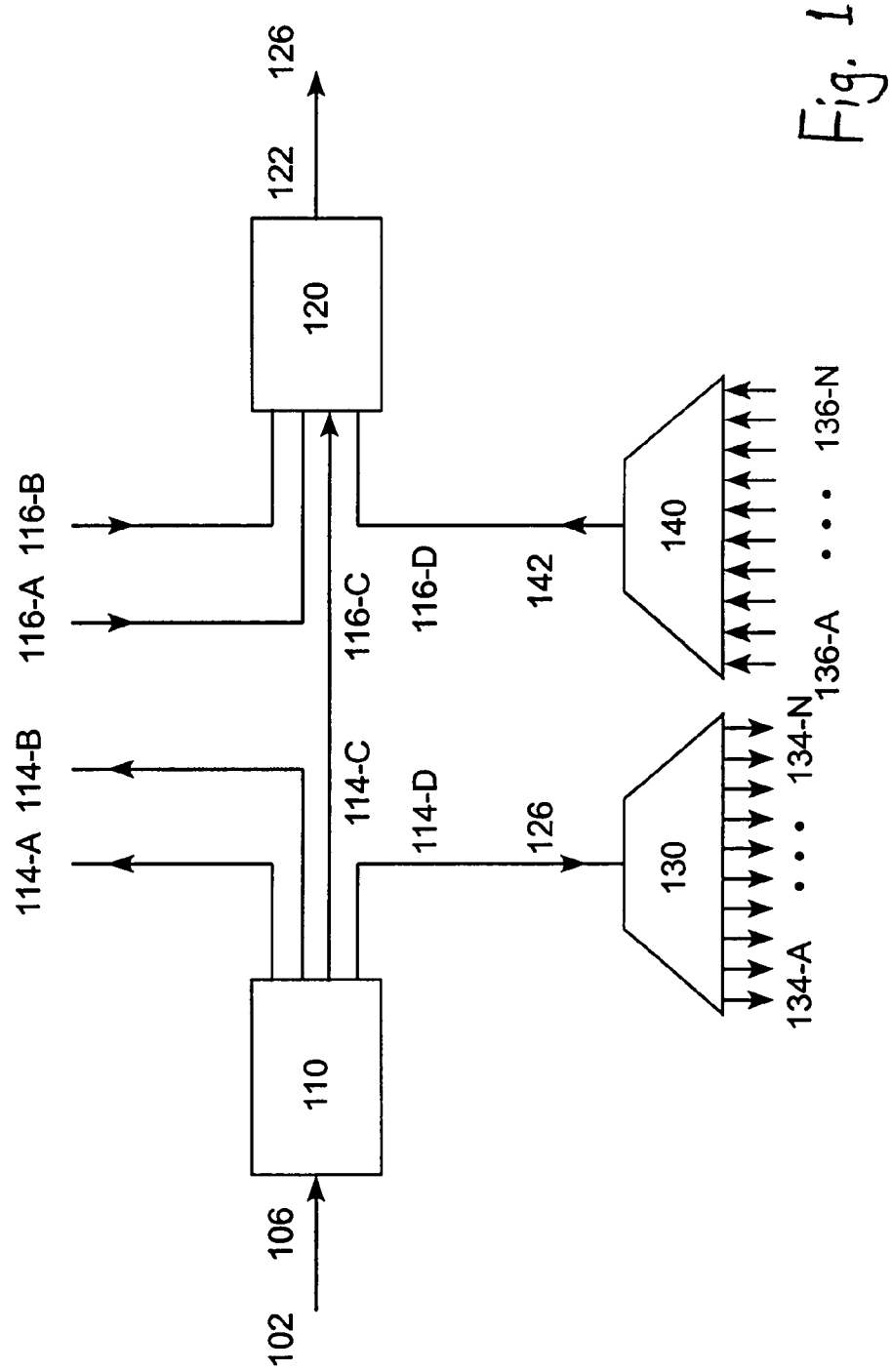
FIG. 1 is an illustration of a prior art network node architecture using WSS's and multiplexers/demultiplexers.
Figure 2:
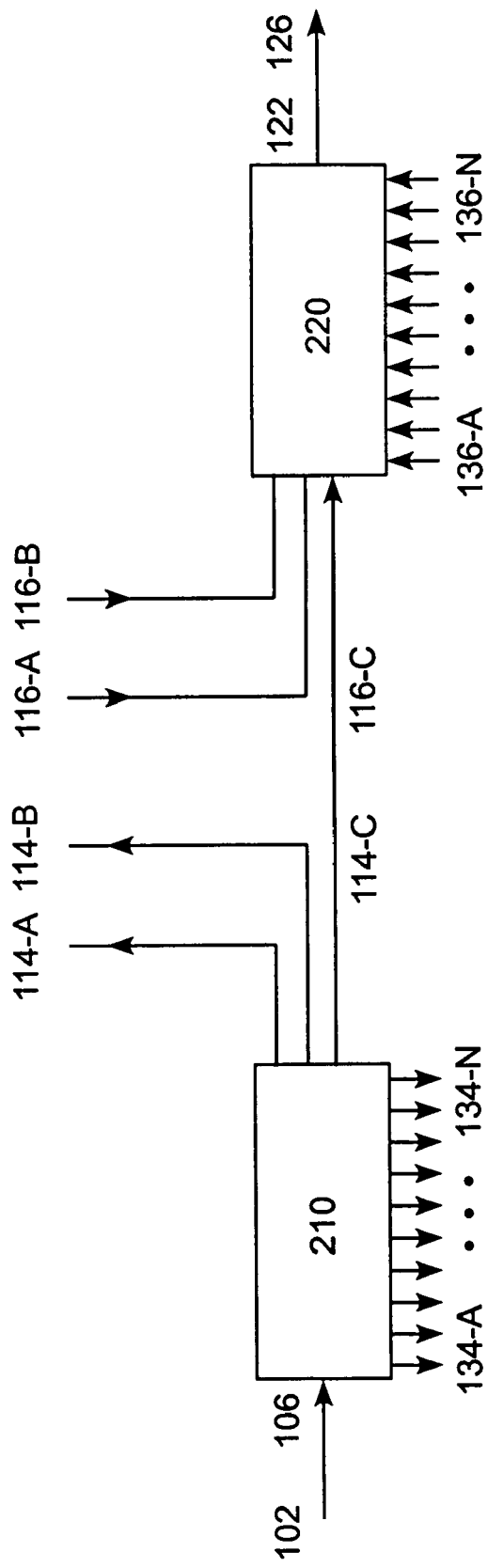
FIG. 2 is an illustration of an improved network node architecture using WSS's with multiplexer/demultiplexer functionality.

An improvement over conventional architecture 100 is an architecture 200 as illustrated in FIG. 2. The difference between architectures 100 and 200 is in the capabilities of a new demultiplexing type WSS 210 over previous demultiplexing type WSS 110 and a new multiplexing type WSS 220 over previous multiplexing type WSS 120. In architecture 200, the demultiplexing capability previously performed by demultiplexer 130 has been incorporated into WSS 210. Analogously, the multiplexing capability previously performed by multiplexer 140 has been incorporated into WSS 220. Architecture 200 in accordance with the present invention, has fewer elements than architecture 100, and provides for reduced components and lesser losses in routing from ingress fiber 102 to drop ports 134-A through 134-N, and from add ports 136-A through 136-N to egress fiber 126.

Generally, embodiments of the present invention provide a wavelength-selective switch with an embedded multiplexer/demultiplexer based on a stacked array of planar lightwave circuits (PLC's) and free-space switching between the PLC's. Various embodiments of the present invention can switch optical WDM channels among multiplexed input/output ports and to the demultiplexed ports.

In accordance with the present invention, the PLCs in the stack have different functionality. More particularly, all but one of the PLCs in the stack have substantially identical features including one or more waveguides, each connected to a free space region, further connected to a waveguide array that terminates at the PLC edge facet. The PLC edge facets are placed at the front focal plane of a lens, that operates so as to generate a spectrally resolved optical signal at the back focal plane of the lens, thereby implementing a spatial Fourier transform. Due to the use of a single lens for spatially Fourier transforming all the edge facets of the PLC array, the spectrally resolved optical signal of all the PLCs in the array are superimposed on each other, differing only by propagation direction. A tilting micro-mirror array may be placed at the back focal plane to reflect the spectral components, and implement a wavelength-selective switch. The reflected light can couple to any of the remaining PLC, where the channels will be multiplexed, or to the different PLC in the stack. The different PLC in the stack, which implements the multiplexer/demultiplexer, has a waveguide array that also terminates at the edge facet, but this PLC is designed to separate the channels to individual demultiplexed waveguides, as opposed to multiplexing the channels to a single waveguide. Other aspects of the different PLC include arrayed waveguide gratings and free space regions, designed to provide the necessary passband characteristics for the demultiplexed output channels.

Reference herein to "one embodiment", "an embodiment", or similar formulations, means that a particular feature, structure, operation, or characteristic described in connection with the embodiment, is included in at least one embodiment of the present invention. Thus, the appearances of such phrases or formulations herein are not necessarily all referring to the same embodiment. Furthermore, various particular features, structures, operations, or characteristics may be combined in any suitable manner in one or more embodiments.

As used herein, unless otherwise noted, the expression "substantially identical" means that the referenced items are intended to be identical but may have slight differences resulting from the manufacturing tolerances of the various operations required to construct such items.

Figure 3:
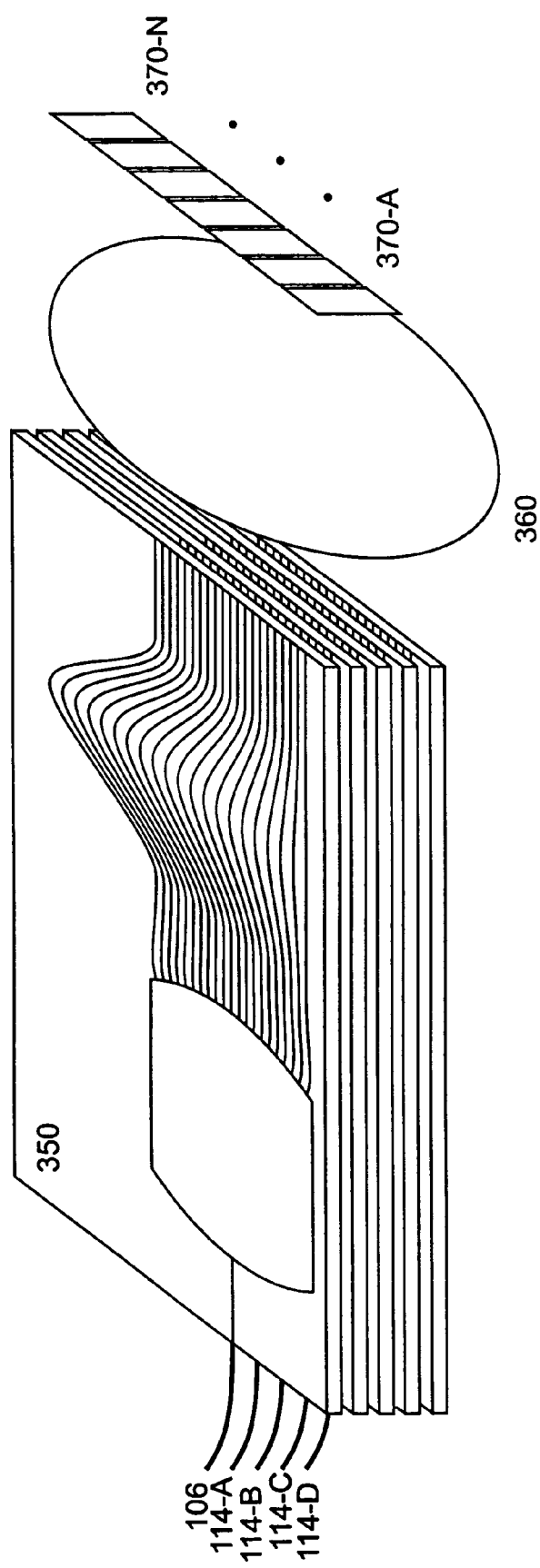
FIG. 3 shows an illustration of prior art WSS, consisting of PLC stack, each PLC implementing an AWG, a lens, and a micro-mirror array.
Figure 4:
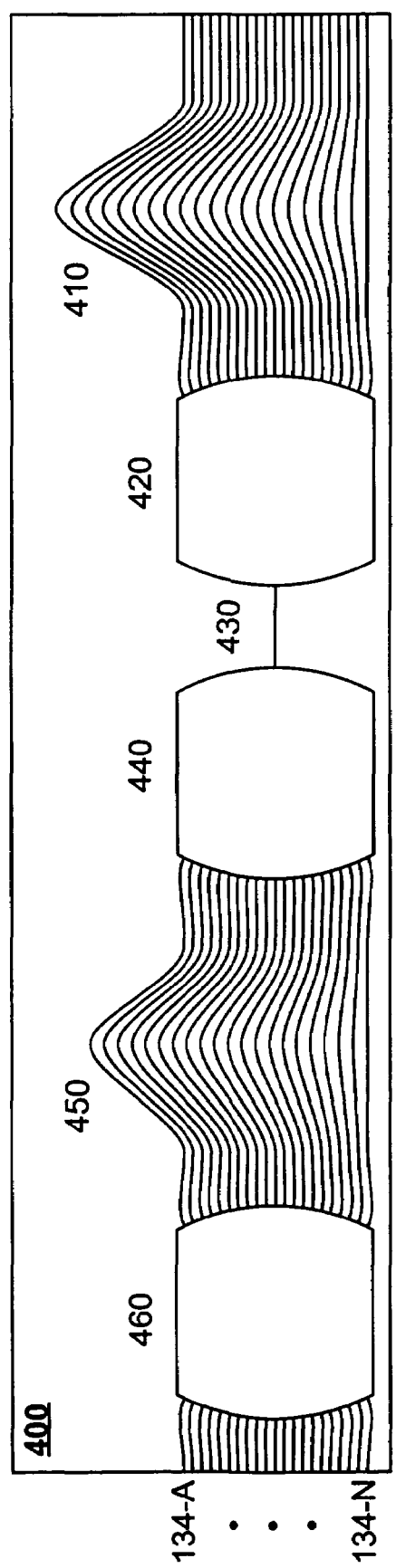
FIG. 4 shows an illustrative embodiment of a PLC, in accordance with the present invention, that remultiplexes the channels and separates the channels to individual output fibers.

A WSS can be constructed in various fashions. One possible prior art method for implementing a WSS 300 combines a planar lightwave circuit (PLC) stack and free-space optics, as depicted in FIG. 3. Each PLC 350 in the stack has a common waveguide for WDM multiplexed channel, a free-space region, and an arrayed waveguide grating (AWG) terminating at the edge facet. In one embodiment for a demultiplexing-type WSS, the WSS input port 102 is attached to the top PLC in the stack. Light is guided on the PLC to the edge facet of the AWG and radiates out. A lens 360 performs a spatial Fourier transform, resulting in the spatial separation of the WDM channel's at the lens's back focal plane. A micro-electro-mechanical-system (MEMS), or other technology that provides reflective surfaces that can change their angle of reflectance, mirror array 370-A through 370-N can each tilt to cause the reflected light to propagate at a desired direction. Each mirror in the array is assigned to a particular wavelength channel. The reflected light from each mirror, or each channel, is back propagated through lens 360 and made incident on the edge facet of a different PLC in the stack. The light couples to the PLC and propagates to the single waveguide where the channels are multiplexed, and connected to output port fiber 114-A through 114-D. In WSS 300, all PLCs are identical, or substantially identical, and serve to generate angular dispersion at the AWG edge facet for the multiplexed input signal. When light is propagating back to the PLC's, the AWG undoes the angular dispersion, and the signal is multiplexed to the output waveguide.

In embodiments of the present invention, demultiplexing capability is added to the WSS. In some embodiments of the invention, this added capability is achieved by replacing one of the substantially identical PLCs in the stack with a different one. PLC 400 shows an illustrative embodiment of such a different PLC. For demultiplexing functionality, light destined to the demultiplexer is first made incident onto the AWG edge facet, as in the previously described PLC. The light traverses AWG 410, which undoes the angular dispersion, passes through free space region 420, and the light couples to single waveguide 430 where the channels are all multiplexed. AWG 410, free space region 420, and single waveguide 430 are all equivalent to the remaining PLCs in the stack. In PLC 400, single waveguide 430 couples to a second free space region 440, second AWG 450, third free space region 460, and to individual waveguides 134-A through 134-N, where the channels are demultiplexed. A fiber array can be attached to the output waveguides to carry the channels to opto-electronic detectors. The two free-space regions 440 and 460, and an interconnecting AWG 450 constitute a conventional PLC-based demultiplexer, that has now been implemented adjacent to AWG 410 and free space region 420 that serve to multiplex the channels that are to be demultiplexed. AWGs 410 and 450 have different characteristics, as each is optimized for a specific task. AWG 410 provides high resolution, so that the WDM channel will be well confined on an individual MEMS micro-mirror. AWG 450 provides lower resolution so that the WDM channel will exhibit desired passband characteristics when coupled to the demultiplexed output fiber.

It is noted that in an alternative arrangement, a WSS in accordance with the invention can also be constructed to switch horizontally, in which case there would be a single PLC with several arrayed waveguide gratings. In other words, in such an embodiment there would not be a stack of PLCs.

Figure 5:
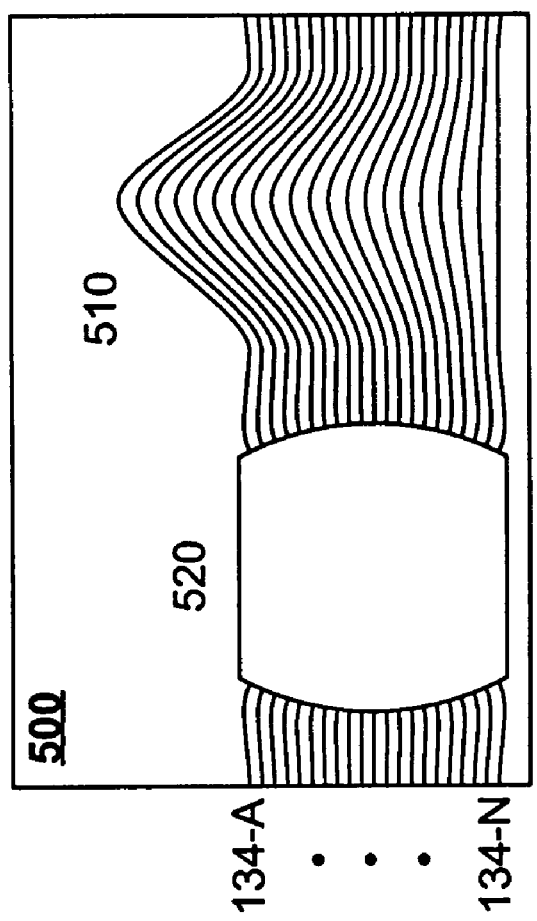
FIG. 5 shows an illustrative embodiment of a PLC, in accordance with the present invention, that separates the channels to individual output fibers.

Referring to FIG. 5, a PLC 500 shows an illustrative embodiment of the different PLC. A single AWG 510 connects to free space region 520, and to individual waveguides 134-A through 134-N, where the channels are demultiplexed. AWG 510 is different from both AWG 410 and 450 in PLC 400. AWG 510 is equivalent to AWG 410 minus AWG 450. In other words it reduces the angular dispersion provided by AWG 410 from one of the other PLCs in the stack, such that the residual angular dispersion will exhibit desired passband characteristics when coupled to the demultiplexed output fiber.

With reference to the Figures, the design of the AWGs is now described in more detail. Let the single-output type AWG (type 350) have grating order A. All AWGs in the stack that are of type 350 have the grating order A. AWG type 510 must have a grating order B<A. A typical relation would be B=A/2. Other AWG parameters would be the same for both types, including total arm number and waveguide pitch at the edge facet.

Another way to understand the operation of the device is that the free-space optics cause an image inversion. For example, suppose the light exits a first PLC and is redirected by the mirror to a second PLC. The light in the shortest grating arm in the first PLC will be imaged to the longest arm in the second PLC, and likewise the light in the longest grating arm in the first PLC will be imaged to the shortest arm in second PLC. This means that the net grating order the light will experience is the $A_1-A_2$, where $A_1$ and $A_2$ are the grating orders in the first PLC and the second PLC, respectively. The PLCs acting as WSS inputs and outputs have $A_1=A_2$, and thus the net grating order is zero and no de/multiplexing occurs. However, when going from a WSS input/output type PLC to a demux PLC, $A_1$ does not equal $A_2$, and de/multiplexing occurs.

It will be appreciated by those skilled in the art and having the benefit of this disclosure, that a multiplexing-type WSS with a multiplexer for the add channels is constructed from the same elements as a demultiplexing-type WSS with a demultiplexer, due to the reciprocal nature of light propagation through passive optical elements. In a multiplexing-type WSS with a multiplexer, the added channels are introduced at the individual waveguides 134-A through 134-N. The light propagates through the PLC to the edge facet where it radiates onto the MEMS micro-mirrors, which direct the channels onto the PLC that multiplexes the channels onto the output port of the PLC.

Furthermore, PLC-based gratings have a temperature dependence. This causes the spectral response to shift with temperature. Thus, normally PLCs are held at a constant temperature. This consumes significant electrical power and requires a warm-up time and extra electronics. One solution is to make the micro-mirror array shift spatially with temperature, using an appropriate mechanical design, to compensate the PLC temperature dependence. This would allow the entire device to maintain its wavelength alignment without temperature control. So an apparatus in accordance with this aspect of the invention would include a micro-mirror array that shifted spatially using temperature-sensitive materials in order to compensate for the wavelength-shift due to temperature changes in the PLCs.

It will be appreciated by those skilled in the art and having the benefit of this disclosure, that each PLC can contain more than one AWG, for supporting both regular multiplexed output ports and individual demultiplexed output ports on a single PLC.

CONCLUSION

Wavelength-selective switches formed from stacked PLCs and having embedded multiplexing or demultiplexing functionality have been described herein.

One advantage of various embodiments of the present invention is reduced loss in routing optical signals from an ingress fiber to drop ports, and in routing optical signals from add ports to an egress fiber.

It is to be understood that the present invention is not limited to the embodiments described above, but encompasses any and all embodiments within the scope of the subjoined Claims and their equivalents.

We claim:

1. A wavelength-selective switch, comprising:
    a lens;
    a micro-mirror array; and
    a plurality of stacked planar lightwave circuits, each further comprising a waveguide grating and a facet facing the lens and micro-mirror array;
    wherein a first planar waveguide circuit of the plurality of planar waveguide circuits comprises a first edge facet; a first arrayed waveguide grating coupled to the first edge facet; a first free space region coupled to the first arrayed waveguide grating; a single waveguide coupled to the first free space region; a second free space region coupled to the single waveguide; a second arrayed waveguide grating coupled to the second free space region; a third free space region coupled to the second arrayed waveguide grating; and a plurality of individual waveguides each coupled to the third free space region.

2. The wavelength-selective switch of claim 1, wherein the micro-mirror array is a tilting micro-mirror array positioned at the back focal plane of the lens.

3. The wavelength-selective switch of claim 1, wherein the planar waveguide circuits of the plurality of planar waveguide circuits, other than the first planar waveguide circuit, are substantially identical.

4. The wavelength-selective switch of claim 1, wherein the first planar waveguide circuit is operable to provide predetermined passband characteristics.

5. The wavelength-selective switch of claim 1, wherein the first arrayed waveguide grating is operable to undo angular dispersion; and wherein the plurality of individual waveguides are adapted for coupling to a fiber array.

6. The wavelength-selective switch of claim 1, wherein the first arrayed waveguide grating and the second arrayed waveguide grating have different characteristics.

7. The wavelength-selective switch of claim 6, wherein the first arrayed waveguide grating provides a first resolution such that a wavelength division multiplexed channel is well confined on an individual micro-mirror of the micro-mirror array.

8. The wavelength-selective switch of claim 6, wherein the second arrayed waveguide grating provides a second resolution such that a wavelength division multiplexed channel exhibits predetermined passband characteristics when coupled to the output fiber.

9. The wavelength-selective switch of claim 1, wherein the at least one input port is coupled to the planar waveguide circuit that is disposed on the top of the stack.

10. An optical network node, comprising:
    a first wavelength-selective switch, having at least one input port adapted to couple to at least one ingress fiber, the first wavelength-selective switch having a plurality of drop ports, and at least one output port; and
    a second wavelength-selective switch, having at least one input port coupled to the at least one output port of the first wavelength-selective switch, the second wavelength-selective switch having a plurality of add ports, and at least one output port;
    wherein the first wavelength-selective switch includes a stack of planar lightwave circuits having the plurality of add ports integrated therein, and the second wavelength-selective switch includes a stack of planar lightwave circuits having the plurality of drop ports integrated therein.

11. The optical network node of claim 10, wherein the stack of planar lightwave circuits of the first wavelength-selective switch comprises:
    a plurality of stacked, substantially identical, first planar waveguide circuits, each comprising a single waveguide connected to a free space region, and further connected to an arrayed waveguide grating that terminates at a planar waveguide circuit edge facet;
    a second planar waveguide circuit, different from the first planar waveguide circuits, stacked with the plurality of first planar waveguide circuits; and
    a lens, positioned such that the planar waveguide circuit edge facets are at a front focal plane of the lens, operable to generate a spectrally resolved optical signal at a back focal plane of the lens, thereby implementing a spatial Fourier transform;
    wherein the wavelength-selective switch has at least one input port and at least one output port.

12. The optical network node of claim 11, wherein the first wavelength-selective switch further comprises a tilting micro-mirror array positioned at the back focal plane of the lens, operable to reflect the spectral components.

13. The optical network node of claim 12, wherein the second planar waveguide of the first wavelength-selective switch comprises:
   a first edge facet;
   a first arrayed waveguide grating coupled to the first edge facet;
   a first free space region coupled to the first arrayed waveguide grating;
   a single waveguide coupled to the first free space regions;
   a second free space region coupled to the single waveguide;
   a second arrayed waveguide grating coupled to the second free space region;
   a third free space region coupled to the second arrayed waveguide grating; and
   a plurality of individual waveguides each coupled to the third free space region;
   wherein the first arrayed waveguide grating is operable to undo angular dispersion; and wherein the plurality of individual waveguides are adapted for coupling to a fiber array.

14. The optical network node of claim 10, wherein the first wavelength-selective switch and the second wavelength-selective switch are the same.

15. The optical network node of claim 12, wherein the second planar waveguide of the first wavelength-selective switch comprises:
   a first edge facet;
   a first arrayed waveguide grating coupled to the first edge facet;
   a free space region coupled to the first arrayed waveguide grating; and
   a plurality of individual waveguides each coupled to the free space region;
   wherein the first arrayed waveguide grating has a grating order which is less than a grating order of the arrayed waveguide grating of the first planar waveguide circuit.

16. The optical network node of claim 15, wherein the grating order of the first arrayed waveguide grating is one-half the grating order of the arrayed waveguide grating of the first planar waveguide circuit.

17. The optical network node of claim 10, wherein a plurality of substantially identical, first planar waveguide circuits, each comprising at least one waveguide connected to a free space region, and further connected to an arrayed waveguide grating that terminates at a planar waveguide circuit edge facet; and a second planar waveguide circuit, different from the first planar waveguide circuits, horizontally adjacent with the plurality of first planar waveguide circuits.

18. A method of producing a wavelength-selective switch, comprising:
   stacking a plurality of substantially identical first planar waveguide circuits, the first planar waveguide circuits having edge facets;
   stacking a second planar waveguide circuit, the second planar waveguide circuit different from the first planar waveguide circuits, with the plurality of first planar waveguide circuits, the second planar waveguide circuit having an edge facet;
   positioning a lens such that the first and second planar waveguide circuit edge facets are at a front focal plane of the lens, and the lens is operable to generate a spectrally resolved optical signal at a back focal plane of the lens;
   positioning a tilting micro-mirror array at the back focal plane of the lens, such that the tilting micro-mirror array is operable to reflect the spectral components; and
   coupling a fiber array to the second planar waveguide circuit.

19. The method of claim 18, wherein the second planar waveguide circuit comprises:
   a first edge facet;
   a first arrayed waveguide grating coupled to the first edge facet;
   a first free space region coupled to the first arrayed waveguide grating;
   a single waveguide coupled to the first free space regions;
   a second free space region coupled to the single waveguide;
   a second arrayed waveguide grating coupled to the second free space region;
   a third free space region coupled to the second arrayed waveguide grating; and
   a plurality of individual waveguides each coupled to the third free space region;
   wherein the first arrayed waveguide grating is operable to undo angular dispersion; and wherein the plurality of individual waveguides are adapted for coupling to a fiber array.

20. The method of claim 18, wherein the second planar waveguide circuit comprises:
   a first edge facet;
   a first arrayed waveguide grating coupled to the first edge facet;
   a free space region coupled to the first arrayed waveguide grating; and
   a plurality of individual waveguides each coupled to the free space region;
   wherein the first arrayed waveguide grating has a grating order which is less than a grating order of the arrayed waveguide grating of the first planar waveguide circuit.

* * * * *